United States Patent
Yabuhara et al.

(10) Patent No.: US 6,518,336 B1
(45) Date of Patent: Feb. 11, 2003

(54) FLAME-RETARDENT RESIN COMPOSITIONS COMPRING THERMOPLASTIC RESIN, THERMOTROPIC LIQUID CRYSTAL POLYMER, AND HOALOGEN-FREE PHOSPHAZEN COMPOUND

(75) Inventors: Tadao Yabuhara, Tokushima (JP); Yuji Tada, Tokushima (JP); Takashi Kameshima, Tokushima (JP); Shinji Nakano, Itano-gun (JP); Yoichi Nishioka, Tokushima (JP); Hiroyuki Takase, Itano-gun (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 09/720,233

(22) PCT Filed: Jul. 2, 1999

(86) PCT No.: PCT/JP99/03597
§ 371 (c)(1),
(2), (4) Date: Dec. 19, 2000

(87) PCT Pub. No.: WO00/04097
PCT Pub. Date: Jan. 27, 2000

(30) Foreign Application Priority Data

Jul. 14, 1998 (JP) .............................. 98-198890

(51) Int. Cl.⁷ ..................... C08K 5/5357; C08K 5/5373
(52) U.S. Cl. ................... 524/116; 525/450; 525/467
(58) Field of Search ................. 524/116; 525/450, 525/467

(56) References Cited

U.S. PATENT DOCUMENTS

| | | | | |
|---|---|---|---|---|
| 3,356,769 A | * | 12/1967 | Allcock | |
| 3,859,249 A | * | 1/1975 | McNeely | |
| 3,865,783 A | * | 2/1975 | Clutter | |
| 3,996,312 A | * | 12/1976 | Kolich et al. | |
| 4,026,639 A | * | 5/1977 | Dieck et al. | |
| 4,405,738 A | * | 9/1983 | McNeely | |
| 5,041,478 A | * | 8/1991 | Sugawara et al. | |
| 5,346,970 A | * | 9/1994 | Dashevsky et al. | |
| 5,652,285 A | * | 7/1997 | Coggin et al. | |
| 5,843,541 A | * | 12/1998 | Alanko et al. | |

FOREIGN PATENT DOCUMENTS

| | | |
|---|---|---|
| EP | 1 063 252 A1 | 12/2000 |
| JP | 7-292233 | 11/1995 |
| JP | 7-331051 | 12/1995 |
| JP | 9-59524 | 3/1997 |
| JP | 11-181268 | 7/1999 |
| JP | 11-255876 | 9/1999 |
| WO | WO 97/40092 | 10/1997 |

OTHER PUBLICATIONS

Dripping resistant, flame retardant thermoplastic resin compsn–contains dripping inhibitor resin of non–softening vinyl! contg. silicone resin and/or poly:phosphorus–contg WPI WORLD PATENT INF.

* cited by examiner

*Primary Examiner*—Peter Szekely
(74) *Attorney, Agent, or Firm*—Knobbe, Martens, Olson & Bear LLP

(57) ABSTRACT

This invention provides a flame-retardant resin composition comprising:

(A) 100 parts by weight of a thermoplastic resin other than a thermotropic liquid crystal polymer, (B) 0.01 to 50 parts by weight of a thermotropic liquid crystal polymer, and (C) 1 to 30 parts by weight of a halogen-free phosphazene compound, the invention providing a novel flame-retardant resin composition which is free of the problems arising due to the presence of halogen element, the composition being excellent in flame retardancy, mechanical properties, molding processability and the like, and being unlikely to cause dripping.

20 Claims, No Drawings

FLAME-RETARDENT RESIN COMPOSITIONS COMPRING THERMOPLASTIC RESIN, THERMOTROPIC LIQUID CRYSTAL POLYMER, AND HOALOGEN-FREE PHOSPHAZEN COMPOUND

FIELD OF THE INVENTION

The present invention relates to novel flame-retardant resin compositions.

BACKGROUND ART

Thermoplastic resins are used as materials for producing various devices in many fields such as office automation devices, household electrical appliances, etc. because of their excellent molding processability, mechanical properties, appearance and like features. These resins are often required to have flame retardancy depending on use to eliminate problems on exposure to heat and ignition.

In order to impart flame retardancy to thermoplastic resins, it is general to add a halogen-containing organic compound as a flame retardant, such as tetrabromobisphenol A, decabromodiphenyl oxide or the like. However, the inclusion of halogen-containing organic compounds poses problems of reducing the thermal stability of a thermoplastic resin as the matrix, corroding the mold with a gas given off on decomposition of halogen-containing organic compound during molding, or producing as by-product low molecular toxic halogen compounds in molding or on combustion.

Halogen-free phosphoric ester compounds have been proposed as flame retardant for thermoplastic resins. Compositions are proposed in which triphenylphosphate/polytetrafluoroethylene (PTFE) or condensable phosphoric ester/PTFE are incorporated in a resin mixture of aromatic polycarbonate and rubber-fortified styrene resin (European Patent No. 174,493 and Dutch Patent No. 8,802,346), in which a crystalline powdery aromatic diphosphate compound is added to a thermoplastic resin (Japanese Unexamined Patent Publication No. 1079/1993 and U.S. Pat. No. 5,122,556), etc. Halogen-free phosphoric ester compounds have the drawback of adversely affecting the mechanical properties and molding processability of thermoplastic resins although capable of imparting a certain degree of flame retardancy to thermoplastic resins. Further, phosphoric ester compounds tend to plasticize a resin and thus are likely to cause dripping (falling of live charcoal during burning), so that a dripping inhibitor such as PTFE is essentially used. Especially the prevention of dripping is required for attaining a V-0 level of flame retardancy in a test according to the flame retardancy test UL-94 (Test for Flammability of Plastic Materials for Parts in Devices and Appliances UL-94, Fourth Edition).

On the other hand, in order to impart flame retardancy to a resin composition comprising a thermotropic liquid crystal polymer and other thermoplastic resin, use is made of a bromine-containing organic compound such as brominated polystyrene (Japanese Unexamined Patent Publication No. 179051/1991), a phosphoric ester compound (Japanese Unexamined Patent Publications No. 331051/1995 and No. 59524/1997) or the like. However, the incorporation of a bromine-containing organic compound results in lower thermal stability, corrosion of mold during molding process and generation of toxic bromine compounds, as in the above-mentioned case. When a phosphoric ester is used, it is essential to jointly add a dripping inhibitor such as PTFE, a fibrous inorganic filler or the like.

DISCLOSURE OF THE INVENTION

An object of the present invention is to provide a novel flame-retardant resin composition which is free of the foregoing-problems of the prior art.

Another object of the invention is to provide a novel flame-retardant resin composition which is free of the problems arising due to the presence of halogen element, excellent in flame retardancy, mechanical properties, molding processability and the like, and unlikely to cause dripping without use of a dripping inhibitor.

Other objects and features of the invention will become apparent from the following description.

The present inventors carried out extensive research to overcome the foregoing problems and found that when a specific flame retardant is added to a mixture of a thermotropic liquid crystal polymer and other thermoplastic resin, the obtained flame-retardant resin composition is excellent in flame retardancy, mechanical strength, and molding processability, and eliminates the need for a dripping inhibitor. The present invention was completed based on this novel finding.

According to the present invention, there is provided a flame-retardant resin composition comprising:

(A) 100 parts by weight of a thermoplastic resin other than a thermotropic liquid crystal polymer, (B) 0.01 to 50 parts by weight of a thermotropic liquid crystal polymer, and (C) 1 to 30 parts by weight of a halogen-free phosphazene compound.

The flame-retardant resin composition of the present invention contains, as essential components, (A) a thermoplastic resin other than a thermotropic liquid crystal polymer, (B) a thermotropic liquid crystal polymer, and (C) a halogen-free phosphazene compound.

Conventional resins may be used as the thermoplastic resin (A) other than a thermotropic liquid crystal polymer in the composition of the invention. Examples of such resins are polyethylene, polypropylene, polyisoprene, polybutadiene, polystyrene, high impact-resistant polystyrene (HIPS), acrylonitrile-styrene resin (AS resin), acrylonitrile-butadiene-styrene resin (ABS resin), methyl methacrylate-butadiene-styrene resin (MBS resin), methyl methacrylate-acrylonitrile-butadiene-styrene resin (MABS resin), acrylonitrile-acrylic rubber-styrene resin (AAS resin), polyalkyl (meth)acrylate, aromatic polycarbonate (PC), polyphenylene ether (PPE), polyphenylene sulfide (PPS), polyether sulfone (PES), polysulfone (PSU), polybutylene terephthalate (PBT), polyethylene terephthalate (PET), polyamide (PA), polyether ketone (PEK), polyether ether ketone (PEEK), polyamide imide (PAI), polyether imide (PEI), Aft polyimide (PI), etc. Among them, preferred are PC, PBT, PPE, ABS resins, HIPS and the like. These resins may be used either alone or in combination. Preferred combinations of two of the resins are PC/ABS, PC/PBT, PPE/HIPS and the like. Among them, PC/ABS is more preferable. The ratio (by weight) of two resins in this case is usually 10-90/90-10, preferably 20-80/80-20.

The thermotropic liquid crystal polymer (B) in the composition of the invention is not known to have drip inhibitory activity itself, but is considered to act as a dripping inhibitor in coexistence with a halogen-free phosphazene compound as in the composition of the invention. Stated more specifically, the thermotropic liquid crystal polymer densely and firmly reinforces the thermoplastic resin so as not to form an inflammable low molecular compound within the thermoplastic resin during combustion, thereby preventing the resin from becoming less viscous with the result that the resin can be inhibited from inducing the level of dripping specified in the flame retardancy test (UL-94) in the presence of the phosphazene compound.

As the thermotropic liquid crystal polymer (B), known polyester-based polymers can be suitably used. Examples are main-chain type liquid crystal polymers such as those having, as main structural units, aromatic hydroxycarboxylic acid, polyalkylenediol and aromatic dicarboxylic acid; those having, as main structural units, aromatic hydroxycarboxylic acid and hydroxynaphthoic acid; and those having, as main structural units, aromatic hydroxycarboxylic acid, aromatic dicarboxylic acid and dihydroxybiphenyl; and side chain-type liquid crystal polymers such as those having polyphosphazene as a main chain and polyalkylenediol and aromatic carboxylic acid as side chains; and those having polyphosphazene as a main chain and poly(alkyleneoxy) alkoxyazobenzene as a side chain. Among them, preferred are polymers having p-hydroxybenzoic acid and polyethylene terephthalate as main structural units, those having p-hydroxybenzoic acid and 2-hydroxy-6-naphthoic acid as main structural units, and a polycondensate of said polymer with a dihydroxy compound and/or dicarboxy compound. The flame retardancy (especially a degree of drip inhibition) and mechanical properties can be further improved by using suitably selected dihydroxy compounds and dicarboxy compounds. Useful dihydroxy compounds are, for example, ethylene glycol, hydroquinone, 2,6-dihydroxynaphthalene, 4,4'-dihydroxybiphenyl, bisphenol A and the like. Among them, preferred are ethylene glycol, hydroquinone, 4,4'-dihydroxybiphenyl and the like, and more preferred are ethylene glycol, hydroquinone and the like. Examples of dicarboxy compounds are terephthalic acid, isophthalic acid, 2,6-dicarboxynaphthalene and the like. Among them, terephthalic acid and isophthalic acid are preferable, and terephthalic acid is more preferable. The dihydroxy compounds and dicarboxy compounds can be used either alone or in combination. When terephthalic acid is used as the dicarboxy compound, the amount of the terephthalic acid used is at least 40% by weight, preferably at least 60% by weight, based on the total amount of dihydroxy compound and/or dicarboxy compound. The flame-retardant resin composition can be further improved in flame retardancy, mechanical strength and the like by using at least 40% by weight of terephthalic acid.

The amount of the thermotropic liquid crystal polymer (B) used is usually 0.01 to 50 parts by weight, preferably 0.1 to 40 parts by weight, more preferably 0.5 to 30 parts by weight, per 100 parts by weight of the thermoplastic resin (A) other than said polymer, in view of the mechanical properties (especially toughness), flame retardancy, fluidity and other properties of the obtained flame-retardant resin composition.

The halogen-free phosphazene compound (C) in the composition of the invention (hereinafter referred to as "halogen-free phosphazene compound") includes known compounds disclosed in patent publications, literature, etc., specifically in James E. Mark, Harry R. Allcock and Robert West, "Inorganic Polymers" Prentice-Hall International, Inc., 1992, pp. 61–140.

Stated more specifically, the following compounds (1) to (4) can be exemplified.

(1) Cyclic Phosphazene Compounds Represented by the Formula (1)

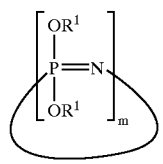

(1)

wherein m is an integer of 3 to 25, two $R^1$ groups are the same or different and each represents a phenyl group substituted with at least one group selected from the class consisting of alkyl groups having 1 to 6 carbon atoms and an allyl group or an unsubstituted phenyl group.

(2) Straight-chain Phosphazene Compounds Represented by the Formula (2)

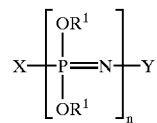

(2)

wherein n is an integer of 3 to 1000, $R^1$ is as defined above, X represents a group $-N=P(OR^1)_3$ or a group $-N=P(O)OR^1$, and Y represents a group $-P(OR^1)_4$ or a group $-P(O)(OR^1)_2$.

(3) Crosslinked Phosphazene Compounds Wherein at Least One of the Foregoing Phosphazene Compounds (1) and (2) is Crosslinked with at Least One Crosslinking Group selected from the Class Consisting of o-phenylene Group, m-phenylene Group, p-phenylene Group, Biphenylene Group, and a Group Represented by the Formula

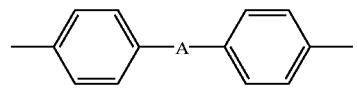

wherein A is a group $-SO_2-$, a group $-S-$, a group $-O-$ or a group $-C(CH_3)_2-$, each of said crosslinking groups being interposed between the two oxygen atoms left after the elimination of group $R^1$ from the phosphazene compound (1) or (2), and the number of the $R^1$ groups in the crosslinked phosphazene compound being 50 to 99.9% based on the total number of $R^1$ groups in said phosphazene compound prior to the crosslinking.

(4) At Least One Phosphazene Compound Selected from the Group Consisting of Cyclic Phosphazene Compounds Represented by the Formula (3)

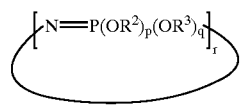

(3)

wherein $R^2$ is a cyano-substituted phenyl group; $R^3$ is an alkyl group having 1 to 18 carbon atoms or an aryl group having 6 to 10 carbon atoms; these groups may be substituted with at least one group selected from alkyl groups having 1 to 10 carbon atoms, allyl group and aryl groups; when two or more $R^3$ groups exist, the $R^3$ groups may be the same or different; p and q are numbers which fulfil the requirements that p>0, q. 0, and p+q=2; and r is an integer of 3 to 25, and a straight-chain phosphazene compound represented by the formula (4)

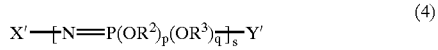

(4)

wherein R², R³, p and q are as defined above; s is an integer of 3 to 1000; X' is a group —P(OR)41 a group —P(OR²)₃(OR³), a group —P(OR²)₂(OR³)₂, a group —P(OR²)(OR³)₃, a group —P(OR³)₄, a group —P(O)(OR²)₂, a group —P(O)(OR²)(OR³), or a group —P(O)(OR³)₂; and Y' is a group —N=P(OR²)₃, a group —N=P(OR²)₂(OR³), a group —N=P(OR²)(OR³)₂, a group —N=P(OR³)₃, a group —N=P(O)OR² or a group —N=P(O)OR³.

The foregoing examples of the halogen-free phosphazene compound (C) can be used either alone or in combination.

Specific examples of the cyclic phosphazene compound (1) and the straight-chain phosphazene compound (2) include a mixture of phosphazene compounds in which phenoxy groups and/or alkoxy groups are introduced as substituents and which are obtainable from a mixture of cyclic and straight-chain chlorophosphazenes, e.g., hexachlorocyclotriphosphazene, octachlorocyclotetraphosphazene and the like, prepared by reacting ammonium chloride and phosphorus pentachloride at about 120 to about 1 30° C.; and hexaphenoxycyclotriphosphazene, octaphenoxycyclotetraphosphazene, decaphenoxycyclopentaphosphazene, hexaalkoxycyclotriphosphazene, octaalkoxycyclotetraphosphazene, decaalkoxycyclopentaphosphazene and like cyclic phosphazene compounds obtained by isolating, from the above mixture of chlorophosphazenes, hexachlorocyclotriphosphazene, octachlorocyclotetraphosphazene, decachlorocyclopentaphosphazene or like single substances, followed by substitution with a phenoxy group and/or an alkoxy group. Specific examples of the straight-chain phosphazene compound (2) include those obtained by heating (at 220 to 250° C.) hexachlorocyclotriphosphazene for ring-opening polymerization to give dichlorophosphazene, followed by substitution with a phenoxy group and/or an alkoxy group.

Specific examples of the crosslinked phosphazene compound (3) are phenoxyphosphazene having 4,4'-sulfonyldiphenylene(bisphenol-S residue) group-crosslinked structure, phenoxyphossphazene having 2,2-(4,4'-diphenylene)isopropylidene group-crosslinked structure, phenoxyphosphazene having 4,4'-oxydiphenylene group-crosslinked structure, phenoxyphoshazene having 4,4'-thiodiphenylene group-crosslinked structure, phenoxyphosphazene having 4,4'-diphenylene group-crosslinked structure, etc.

Specific examples of the phosphazene compounds (4) are monocyanophenoxypentaphenoxycyclotriphosphazene, dicyanophenoxytetraphenoxycyclotriphosphazene, tricyanophenoxytriphenoxycyclotriphosphazene, tetracyanophenoxydiphenoxycyclotriphosphazene, pentacyanophenoxymonophenoxycyclotriphosphazene and like cyclotriphosphazene compounds; monocyanophenoxyhepta-phenoxycyclotetraphosphazene, dicyanophenoxyhexaphenoxycyclotetraphosphazene, tricyanophenoxypentaphenoxy-cyclotetraphosphazene, tetracyanophenoxytetraphenoxy-cyclotetraphosphazene, pentacyanophenoxytriphenoxycyclotetraphosphazene, hexacyanophenoxydiphenoxy-cyclotetraphosphazene, heptacyanophenoxymonophenoxy-cyclotetraphosphazene and like cyclotetraphosphazene compounds; cyclopentaphosphazene compounds having both cyanophenoxy and phenoxy groups as substituents; and like cyclic phosphazene compounds; and straight-chain phosphazene compounds having both cyanophenoxy and phenoxy groups as substituents.

Among these compounds, preferred are a mixture of phenoxyphosphazene compounds which have phenoxy groups as substituents and which are obtainable from a mixture of cyclic and straight-chain chlorophosphazenes, phenoxyphosphazene having 4,4'-sulfonyldiphenylene-crosslinked structure; phenoxyphosphazene having 2,2-(4,4'-diphenylene)-isopropylidene group-crosslinked structure; and phosphazene compounds having both cyanophenoxy and phenoxy groups as substituents.

The halogen-free phosphazene compound (C) used is 1 to 30 parts by weight, preferably 5 to 20 parts by weight, per 100 parts by weight of the thermoplastic resin (A) other than the thermotropic liquid crystal polymer, in view of the mechanical strengths (especially toughness), flame retardancy and other properties of the obtained flame-retardant resin composition.

The essential components in the flame-retardant resin composition of the present invention, i.e.the thermoplastic resin (A), the thermotropic liquid crystal polymer (B) and the halogen-free phosphazene compound (C), can be used in various forms such as powders, beads, flakes, pellets, etc.

The flame-retardant resin composition of the invention may contain conventional additives and fillers for resin within the ranges of amounts which do not adversely affect the desired properties. Examples of useful additives include flame retardants other than the halogen-free phosphazene compounds, UV absorbers, light stabilizers, antioxidants, light screens, metal deactivators, quenching agents, heat resistance stabilizers, lubricants, mold releasing agents, coloring agents, antistatic agents, antiaging agents, plasticizers, impact strength improving agents, compatibilizers and the like. Useful fillers include, for example, mica, kaolin, talc, silica, clay, calcium carbonate, calcium sulfate, calcium silicate, glass beads, glass balloons, glass flakes, glass fibers, fibrous alkali metal salts of titanic acid (potassium titanate fibers, etc.), fibrous transition metal salts of boric acid (aluminum borate fibers, etc.), fibrous alkaline earth metal salts of boric acid (magnesium borate fibers, etc.), zinc oxide whiskers, titanium oxide whiskers, magnesium oxide whiskers, gypsum whiskers, aluminum silicate whiskers, calcium silicate whiskers, silicon carbide whiskers, titanium carbide whiskers, silicon nitride whiskers, titanium nitride whiskers, carbon fibers, alumina fibers, alumina-silica fibers, zirconia fibers, quartz fibers, metal fibers and the like. These additives and fillers can be used either alone or in combination.

The flame-retardant resin composition of the invention can be prepared from the thermoplastic resin (A), the thermotropic liquid crystal polymer (B) and the halogen-free phosphazene compound (C) in specified amounts, optionally in combination with additives and fillers, by mixing and/or kneading the components by conventional methods. The components may be fed all at one time, or two or three components may be mixed, and remaining components may be added and mixed in a suitable order. For example, the mixture of components may be mixed and/or kneaded using an extruder such as a single screw extruder or a twin-screw extruder, or a kneader such as Bunbury mixer, a pressure kneader or a two-roll mill.

The flame-retardant resin composition of the invention can be molded to form a product with the desired shape by conventional molding methods such as injection molding, extrusion molding, vacuum molding, profile extrusion molding, blow molding, foam molding, injection press molding, gas injection molding and the like.

The flame-retardant resin composition of the invention can find wide application in various fields or industries, such as electrical, electronics or telecommunication, agriculture, forestry, fishery, mining, construction, foods, fibers, clothing, medical services, coal, petroleum, rubber, leather, automobiles, precision machinery, timber, furniture, printing, musical instruments, and the like. Stated more specifically, the flame-retardant resin composition of the invention can be used for business or office automation equipment, such as printers, personal computers, word processors, keyboards, PDA (personal digital assistants), telephones, facsimile machines, copying machines, ECR (electronic cash registers), desk-top electronic calculators, electronic databooks, electronic dictionaries, cards, holders and stationery; electrical household appliances and electrical equipment such as washing machines, refrigerators, cleaners, microwave ovens, lighting equipment, game machines, irons and kotatsu (low, covered table with a heat source underneath); audio-visual equipment such as TV, VTR, video cameras, radio cassette recorders, tape recorders, mini discs, CD players, speakers and liquid crystal displays; and electric or electronic parts and telecommunication equipment, such as connectors, relays, condensers, switches, printed circuit boards, coil bobbins, semiconductor sealing materials, electric wires, cables, transformers, deflecting yokes, distribution boards, and clocks and watches. Further, the flame-retardant resin composition of the invention can be widely used for the following applications: articles for automobiles, vehicles, ships, aircrafts and constructions, such as seats (e.g., padding, outer materials, etc.), belts, ceiling covering, convertible tops, arm rests, door trims, rear package trays, carpets, mats, sun visors, wheel covers, mattress covers, air bags, insulation materials, hangers, hand straps, electric wire coating materials, electrical insulating materials, paints, coating materials, overlaying materials, floor materials, corner walls, deck panels, covers, plywoods, ceiling boards, partition plates, side walls, carpets, wall papers, wall covering materials, exterior decorating materials, interior decorating materials, roofing materials, sound insulating panels, thermal insulation panels and window materials; and living necessities and sporting goods such as clothing, curtains, sheets, plywoods, laminated fiber boards, carpets, entrance mats, seats, buckets, hoses, containers, glasses, bags, cases, goggles, skies, rackets, tents and musical instruments.

BEST MODE FOR CARRYING OUT THE INVENTION

The present invention will be described below in more detail with reference to Synthesis Examples, Examples, Comparative Examples and Test Examples. In the following description, the parts and percentages are all by weight, unless otherwise specified.

SYNTHESIS EXAMPLES 1–9

Synthesis of Thermotropic Liquid Crystal Polymers

In a nitrogen atomosphere, a hydroxycarboxylic acid component, a diol component and a dicarboxylic acid component were heated, melted and polycondensated, giving nine kinds of thermotropic liquid crystal polyester polymers. The nine kinds of thermotropic liquid crystal polyester polymers have repeated structural units represented by the following formulas a to j and possess the structural unit composition listed in Table 1.

a: 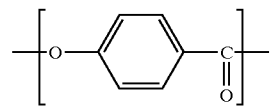

b: 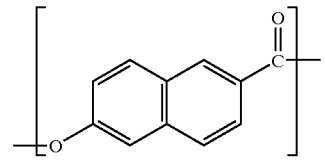

c: 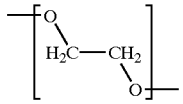

d: 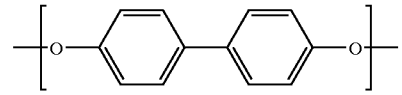

e: 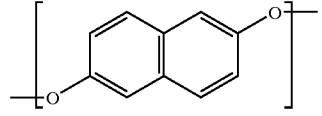

f: 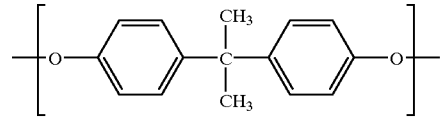

g: 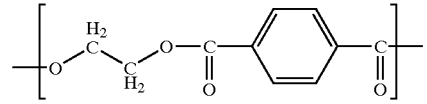

h: 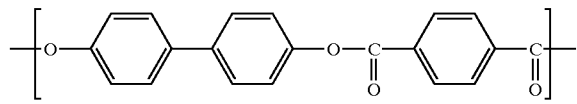

i: 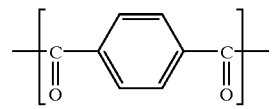

j: 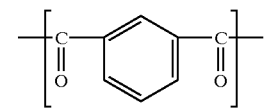

TABLE 1

| Synthesis Example | Structural unit composition of liquid crystal polymer (mole) | | | | | | | | | |
|---|---|---|---|---|---|---|---|---|---|---|
| | a | b | c | d | e | f | g | h | i | j |
| 1 | 60 | 20 | 10 | | | | | | 10 | |
| 2 | 60 | 20 | | 10 | | | | | 10 | |
| 3 | 55 | 25 | | 10 | | | | | 10 | |
| 4 | 60 | 20 | | | 10 | | | | 10 | |
| 5 | 75 | 15 | | | | 5 | | | 5 | |
| 6 | 60 | 20 | 10 | | | | | | 8 | 2 |
| 7 | 60 | 20 | | 10 | | | | | 8 | 2 |
| 8 | 70 | | | | | | 30 | | | |
| 9 | 70 | | | | | | | 30 | | |

SYNTHESIS EXAMPLE 10

Synthesis of Phenoxyphosphazene Compound 10)

A 1.30-mole (123.0 g) quantity of phenol and 500 ml of tetrahydrofuran (THF) were placed into a 4-necked, 1-liter flask equipped with a stirrer, a thermometer, and a reflux condenser, and uniformly stirred to give a solution. Then, 7.6 g of sodium metal was added at a temperature not higher than 25° C. The mixture was heated to 61° C. over 1 hour and was continuously stirred at 61 to 68° C. for 6 hours, giving a sodium phenolate solution.

In parallel with the foregoing reaction, 290 g of a 20% chlorobenzene solution containing 0.5 unit mole (58 g) of dichlorophosphazene oligomers (a mixture of 59% of trimer, 12% of tetramer, 11% of pentamer and hexamer, 3% of heptamer, and 15% of octamer and higher oligomers) was placed into a 4-necked, 2-liter flask. The above-obtained sodium phenolate solution was added dropwise to the contents of the flask with stirring at 25° C. or lower. After dropwise addition, the mixture was stirred at 71–73° C. for 15 hours for reaction.

After completion of the reaction, the reaction mixture was concentrated. Then, the concentrate was re-dissolved in 500 ml of chlorobenzene, and the solution was washed successively with water, with a 5% aqueous solution of sodium hydroxide three times, with 5% sulfuric acid, with a 5% aqueous solution of sodium bicarbonate, and with water three times in this order. The mixture was concentrated and evaporated to dryness to give 108 g of a pale yellow wax-like product (yield 98.5%).

This product had a weight average molecular weight (Mw) of 810 as determined by GPC analysis based on polystyrene standards, and a melting temperature (Tm) of 103° C. as determined by TG/DTA analysis, and the 5% weight loss temperature ($T_5$) and the decomposition starting temperature (Td) of the product were 330° C. and 347° C., respectively. The product had a residual chlorine content (Hy-Cl) of 0.09%. It was found based on the phosphorus content and CHN elemental analysis data that the product is a compound having structural units represented by the following formula.

Compound 10:

wherein —Ph is a phenyl group (hereinafter the same).

SYNTHESIS EXAMPLE 11

Synthesis of Phenoxyphosphazene Having 4,4'-sulfonyldiphenylene(bisphenol-S Residue)-crosslinked Structure (Compound 11)

A pale yellow wax-like product was prepared by conducting a reaction in the same manner as in Synthesis Example 10 using 1.25 moles (118.0 g) of phenol and 0.033 mole (8.3 g) of bisphenol S (yield 91.5%).

This product had a weight average molecular weight (Mw) of 820 as determined by GPC analysis based on polystyrene standards, and the 5% weight loss temperature ($T_5$) and the decomposition starting temperature (Td) of the product were 342° C. and 357° C., respectively. The product had a residual chlorine content (Hy-Cl) of ≦0.01%. It was found based on the phosphorus content and CHN elemental analysis data that the product is a compound having structural units represented by the following formula.

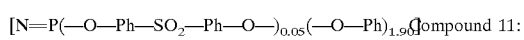

Compound 11:

wherein —Ph— is a p-phenylene group (hereinafter the same).

SYNTHESIS EXAMPLE 12

Synthesis of Phenoxyphosphazene Having 4,4'-oxydiphenylene Group-crosslinked Structure (Compound 12)

The following highly viscous compound was prepared by conducting a reaction in the same manner as in Synthesis Example 11 using 13.4 g (0.066 mole) of bis(4-hydroxyphenyl)ether, 111.7 g (1.19 moles) of phenol and 27.6 g (1.2 g equivalents) of Na metal (yield 99.8%).

This product had a weight average molecular weight (Mw) of 1510 as determined by GPC analysis based on polystyrene standards, and the 5% weight loss temperature ($T_5$) and the decomposition starting temperature (Td) of the product were 346° C. and 353° C., respectively. The product had a residual chlorine content of ≦0.01%. It was found based on the phosphorus content and CHN elemental analysis data that the compound had structural units represented by the following formula.

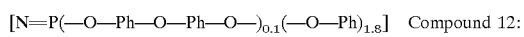

Compound 12:

SYNTHESIS EXAMPLE 13

Synthesis of Phenoxyphosphazene Having 4,4'-thiodiphenylene Group-crosslinked Structure (Compound 13)

The following highly viscous compound was prepared by conducting a reaction in the same manner as in Synthesis Example 12 using 14.4 g (0.066 mole) of 4,4'-thiodiphenol (yield 98.8%).

This product had a weight average molecular weight (Mw) of 1690 as determined by GPC analysis based on polystyrene standards, and the 5% weight loss temperature ($T_5$) and the decomposition starting temperature (Td) of the product were 340° C. and 344° C., respectively. The product had a residual chlorine content (Hy-Cl) of 0.09%. It was found based on the phosphorus content and CHN elemental analysis data that the product is a compound having structural units represented by the following formula.

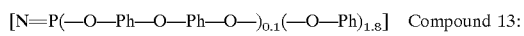

Compound 13:

SYNTHESIS EXAMPLE 14

Synthesis of Phenoxyphosphazene Having 4,4'-diphenylene Group-crosslinked Structure (Compound 14)

The following highly viscous compound was prepared by conducting a reaction in the same manner as in Synthesis Example 13 using 12.3 g (0.066 mole) of 4,4'-diphenol (yield 99.9%).

This product had a weight average molecular 10 weight (Mw) of 1590 as determined by GPC analysis based on polystyrene standards, and the 5% weight loss temperature ($T_5$) and the decomposition starting temperature (Td) of the product were 348° C. and 349° C., respectively. The product had a residual chlorine content (Hy-Cl) of 0.01%. It was found according to the phosphorus content and CHN elemental analysis data that the product is a compound having structural units represented by the following formula.

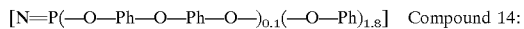

Compound 14:

SYNTHESIS EXAMPLE 15

Synthesis of Phenoxyphosphazene Having Paraphenylene-crosslinked Structure (Compound 15)

Phenol (2.04 moles, 196 g) and 2.04 moles (82 g) of sodium hydroxide were subjected to azeotropic dehydration with use of toluene to prepare about 1200 g of a 20% solution of sodium phenolate in toluene.

In parallel with the above reaction, 580 g of a 20% solution containing 1 unit mole (115.9 g) of dichlorophosphazene oligomers (the same as used in Synthesis Example 10) in chlorobenzene was placed into a 4-necked, 2-liter flask. A 10% solution containing 0.15 mole (18.3 g) of separately prepared dilithium salt of hydroquinone in toluene was added dropwise thereto with stirring. After the dropwise addition, the mixture was subjected to a reaction with stirring at 50° C. for 5 hours. Subsequently, about 1200 g of the previously prepared 20% solution of sodium phenolate in toluene was added dropwise thereto with stirring, and the resulting mixture was subjected to a reaction with stirring at 100° C. for 8 hours.

After the reaction was completed, the reaction mixture was concentrated and poured into 3 liters of a mixture of water/methanol (1/1 by volume) with stirring, and the mixture was neutralized with dilute sulfuric acid and filtered. The obtained product was washed twice with 3 liters of a mixture of water/methanol (1/1 by volume), separated by filtration, and dried at 80° C. for 11 hours to give 220 g of a pale yellow powder (yield 99.7%).

This product had a weight average molecular weight (Mw) of 1200 as determined by GPC analysis based on polystyrene standards, and the 5% weight loss temperature ($T_5$) and the decomposition starting temperature (Td) of the product were 298° C. and 305° C., respectively. The product had a residual chlorine content (Hy-Cl) of 0.01%. It was found based on the phosphorus content and CHN elemental analysis data that the compound had structural units represented by the following formula.

[N=P(—O—Ph—O—Ph—O—)$_{0.15}$(—O—Ph)$_{1.7}$] Compound 15:

SYNTHESIS EXAMPLES 16

Synthesis of Phenoxyphosphazene Having 2,2-(4,4'-diphenylene)isopropylidene Group-crosslinked Structure (Compound 16)

A 86.7 g (0.38 mole) quantity of bisphenol A and 460 ml of tetrahydrofuran were placed into a 4-necked, 2-liter flask. While maintaining the internal temperature at 19° C., 3.5 g (0.5 g equivalent) of Li metal in the form of cut pieces was added thereto with stirring. After the completion of the addition, the temperature was elevated to 61° C. over 1 hour, and the stirring was continued for 4 hours at 61° C. to 68° C. to give a lithium salt of bisphenol A.

A 215.6 g (2.25 moles) quantity of phenol and 500 ml of toluene were placed into a 4-necked, 3-liter flask. While maintaining the internal temperature at 25° C., 34.5 g (1.5 g equivalents) of sodium metal in the form of cut pieces was added thereto with stirring. After completion of the addition, the temperature was elevated to 77° C. over 4 hours, and the stirring was continued for 3 hours at 77° C. to 113° C. to give phenolate.

A 313.1 g (1.0 mole) quantity of dichlorophosphazene oligomers (the same as used in Synthesis Example 10) was placed into a 4-necked, 5-liter flask. While maintaining the internal temperature at 20° C., the solution of lithium salt of bisphenol A was added dropwise thereto over 1 hour with stirring. Then, while maintaining the internal temperature at 20° C., the sodium phenolate solution was added dropwise thereto over 1 hour with stirring. After the dropwise addition, the stirring was continued for 13 hours at 47° C.

After the reaction was completed, the reaction mixture was concentrated, and the concentrate was washed three times with 3 liters of a 2% aqueous solution of NaOH, filtered, washed three times with 3 liters of a mixture of water/methanol (1/1 by volume), filtered, concentrated, and dried at 80° C. for 11 hours to give a 20 white powder (amount 208.7 g, and yield 86.5%).

This product had a weight average molecular weight (Mw) of 1190 as determined by GPC analysis based on polystyrene standards, and the 5% weight loss temperature ($T_5$) and the decomposition starting temperature (Td) of the product were 308° C. and 316° C., respectively. The product had a residual chlorine content (Hy-Cl) of 0.09%. It was found based on the phosphorus content and CHN elemental analysis data that the compound had structural units represented by the following formula.

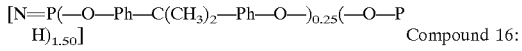

Compound 16:

SYNTHESIS EXAMPLE 17

Synthesis of 4-cyanophenoxy Group-containing Phenoxyphosphazene (Compound 17)

A 4-necked, 2-liter flask equipped with a stirrer, a heater, a thermometer and a dehydrator was charged with 0.44 mole (52.4 g) of 4-cyanophenol, 2.20 moles (207.0 g) of phenol, 2.64 moles (105.6 g) of sodium hydroxide and 1000 ml of toluene. The mixture was refluxed with heating so as to remove water from the system to prepare a solution of sodium salts of cyanophenol and phenol in toluene.

To the solution of sodium salts of cyanophenol and phenol in toluene was added dropwise 580 g of a 20% solution containing 1 unit mole (115.9 g) of dichlorophosphazene oligomers (a mixture of 59% of trimer, 12% of tetramer, 11% of pentamer and hexamer, 3% of heptamer and 15% of octamer and higher cyclic and straight-chain compounds) in chlorobenzene with stirring while maintaining the internal temperature at 30° C. or lower. This mixed solution was refluxed for 12 hours, and then the reaction mixture was washed twice with a 5% aqueous solution of sodium hydroxide. Subsequently, the organic layer was neutralized with dilute sulfuric acid, washed twice with water, filtered, concentrated and dried in a vacuum (the condition of the vacuum drying: 80° C., 5 mmHg, 12 hours) to give 220 9 of a pale yellow viscous liquid. The yield calculated based on the dichlorophos-phazene oligomers used was 92%.

The product showed $^1$H-NMR spectral peaks in the range of 7.6 to 6.6 ppm and $^{31}$P-NMR spectral peaks in the range of 10 to 6, −11 to −14 and −16 to −21 ppm.

The product had a weight average molecular weight (Mw) of 1500 as determined by GPC analysis based on polystyrene standards, and the 5% weight loss temperature ($T_5$) and the decomposition starting temperature (Td) of the product were 310° C. and 327° C., respectively. The product had a residual chlorine content (Hy-Cl) of 0.09%. Based on the phosphorus content and CHN elemental analysis data, the product was found to have structural units represented by the following formula.

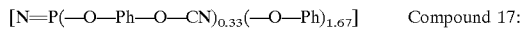  Compound 17:

EXAMPLES 1–16

Pellets of a flame-retardant resin composition according to the present invention were prepared by melting and kneading with a twin-screw extruder (trade name: "S1-KRC 25 mm, Kneader", product of Kurimoto Ltd.) a thermoplastic resin, a thermotropic liquid crystal polymer (indicated as "liquid crystal polymer" in Table 2), and a halogen-free phosphazene compound (indicated as "phosphazene compound" in Table 2) in amounts (part) shown in Table 2. The thermoplastic resins shown in Table 2 are as follows.

PC/ABS: product of MITSUBISHI ENGINEERING-PLASTICS CO., LTD.), trade name "Iupilon S-2000"/product of MITSUI CHEMICALS INC., trade name "SANTAC UT-61"=3/1 (weight ratio) mixture.

PC/PBT: product of MITSUBISHI ENGINEERING-PLASTICS CO., LTD.), trade name "Iupilon S-2000"/product of TORAY INDUSTRIES INC., trade name "PBT-1200S"=7/3 (weight ratio) mixture.

PC: product of Sumitomo Dow Co., Ltd., trade name "CALBRE 300-10".

PPE/HIPS: product of ASAHI CHEMICAL INDUSTRY CO., LTD., trade name "XYRON X-9108".

PPE/PA (polyamide): product of SUMITOMO CHEMICAL CO., LTD., trade name "ARTLEY X-19S".

1. Flexural modulus: JIS-K7203
2. Heat deformation temperature: ASTM D-648, load 18.6 kgf/cm
3. Izod impact strength (IZ): JIS-K7110, as measured at 23° C.
4. Melt flow rate: (MFR): JIS-K7210, as measured at 240° C., load 10 kgf/cm$^2$
5. Flame retardancy: A flame retardancy test was conducted using a test piece measuring 1/16 inch (thickness), 5 inches (length), and 0.5 inch (width) according to the test method of UL-94 (Test for Flammability of Plastic Materials for Parts in Devices and Appliances UL-94, Fourth Edition). The results were assessed according to the following criteria.

V-0: Results which fulfil all the requirements set forth below in A–E.
A: Any of 5 test pieces (5 in one set) flamed continuously burned in flames) for 10 seconds or shorter after contact with flame.
B: After contact with flame a total of 10 times twice each test piece), 5 test pieces (5 in one set) lamed for a total of 50 seconds or shorter.
C: None of 5 test pieces (5 in one set) flamed forward to the clamp.
D: None of 5 test pieces (5 in one set) dripped laming particles which ignite cotton 305 mm below.
E: Any of 5 test pieces (5 in one set) glowed (did not burn in flames but remained as a kindling charcoal) for 30 seconds or shorter after second contact with flame.

V-1: Results which fulfil all the requirements shown below in A–E.
A: Any of 5 test pieces (5 in one set) flamed for 30 seconds or shorter after contact with flame.

TABLE 2

| Example | Thermoplastic resin (part) | Liquid crystal polymer (part) | Phosphazene compound (part) |
|---|---|---|---|
| 1 | PC/ABS (100) | Synthesis Example 1 (1.0) | Synthesis Example 10 (12.5) |
| 2 | PC/ABS (100) | Synthesis Example 2 (0.5) | Synthesis Example 11 (12.5) |
| 3 | PC/ABS (100) | Synthesis Example 3 (1.0) | Synthesis Example 12 (12.5) |
| 4 | PC/ABS (100) | Synthesis Example 4 (1.0) | Synthesis Example 13 (12.5) |
| 5 | PC/ABS (100) | Synthesis Example 5 (1.0) | Synthesis Example 14 (12.5) |
| 6 | PC/ABS (100) | Synthesis Example 6 (1.0) | Synthesis Example 15 (12.5) |
| 7 | PC/ABS (100) | Synthesis Example 7 (1.0) | Synthesis Example 16 (12.5) |
| 8 | PC/ABS (100) | Synthesis Example 8 (1.0) | Synthesis Example 17 (12.5) |
| 9 | PC/ABS (100) | Synthesis Example 9 (1.0) | Synthesis Example 10 (12.5) |
| 10 | PC/PBT (100) | Synthesis Example 1 (2.0) | Synthesis Example 10 (10.0) |
| 11 | PC/PBT (100) | Synthesis Example 3 (2.0) | Synthesis Example 11 (10.0) |
| 12 | PC/PBT (100) | Synthesis Example 8 (2.0) | Synthesis Example 13 (10.0) |
| 13 | PC (100) | Synthesis Example 5 (0.5) | Synthesis Example 10 (5.0) |
| 14 | PPE/HIPS (100) | Synthesis Example 6 (1.0) | Synthesis Example 11 (12.5) |
| 15 | PPE/HIPS (100) | Synthesis Example 7 (1.0) | Synthesis Example 14 (12.5) |
| 16 | PPE/PA (100) | Synthesis Example 8 (5.0) | Synthesis Example 16 (12.5) |

COMPARATIVE EXAMPLES 1 to 16

Pellets of resin compositions were prepared in the same manner as in Examples 1–16 with the exception of not using a thermotropic liquid crystal polymer.

TEST EXAMPLE 1

The pellets of the resin compositions prepared in Examples 1 to 16 and Comparative Examples 1 to 16 were injection-molded by an injection molding machine (trade name "MINIMAT-26/15B", product of SUMITOMO HEAVY INDUSTRIES LTD.) to give test pieces. The test pieces were evaluated as to properties by the following methods.

B: After contact with flame a total of 10 times (twice each test piece), 5 test pieces (5 in one set) flamed for a total of 250 seconds or shorter.

C and D: The same as in V-0

E: Any of 5 test pieces (5 in one set) glowed for 60 seconds or shorter after second contact with flame.

V-2: Results which fulfil all the requirements shown below in A–E.

A, B, C and E: The same as in V-1.

D: At least one of 5 test pieces (5 in one set) dripped flaming particles which ignite cotton 305 mm below.

HB: In a horizontal test, none of 3 test pieces (3 in one set) burned forward to a standard line 101.6 mm away after contact with flame.

6. Degree of dripping: The dripping degree was evaluated in terms of the presence or absence of flaming particles (i.e. dripping) which ignite cotton in the flame retardancy test. The test results are shown in Table 3.

TABLE 3

|  | Flame retardancy UL-94 | Occurrence of dripping | Flexural modulus (kgf/cm$^2$) | Heat deformation temperature (° C.) | IZ (kgf · cm/cm) | MFR (g/10 min) |
|---|---|---|---|---|---|---|
| EX. 1 | V-0 | None | $2.4 \times 10^4$ | 101 | 67 | 35 |
| 2 | V-0 | None | $2.4 \times 10^4$ | 100 | 70 | 36 |
| 3 | V-0 | None | $2.4 \times 10^4$ | 99 | 55 | 38 |
| 4 | V-0 | None | $2.4 \times 10^4$ | 111 | 54 | 40 |
| 5 | V-0 | None | $2.4 \times 10^4$ | 98 | 80 | 44 |
| 6 | V-0 | None | $2.4 \times 10^4$ | 99 | 73 | 33 |
| 7 | V-0 | None | $2.4 \times 10^4$ | 120 | 78 | 60 |
| 8 | V-0 | None | $2.4 \times 10^4$ | 110 | 54 | 54 |
| 9 | V-0 | None | $2.4 \times 10^4$ | 103 | 65 | 40 |
| 10 | V-0 | None | $2.3 \times 10^4$ | 98 | 61 | 41 |
| 11 | V-0 | None | $2.3 \times 10^4$ | 98 | 55 | 38 |
| EX. 12 | V-0 | None | $2.4 \times 10^4$ | 99 | 88 | 61 |
| 13 | V-0 | None | $2.4 \times 10^4$ | 111 | 88 | 59 |
| 14 | V-0 | None | $2.4 \times 10^4$ | 132 | 75 | 39 |
| 15 | V-0 | None | $2.3 \times 10^4$ | 100 | 61 | 30 |
| 16 | V-0 | None | $2.3 \times 10^4$ | 115 | 67 | 35 |
| Comp. Ex. 1 | V-2 | Dripped | $2.4 \times 10^4$ | 89 | 37 | 45 |
| 2 | V-1 | Dripped | $2.4 \times 10^4$ | 90 | 55 | 40 |
| 3 | V-2 | Dripped | $2.4 \times 10^4$ | 93 | 55 | 40 |
| 4 | V-2 | Dripped | $2.4 \times 10^4$ | 85 | 54 | 40 |
| 5 | V-2 | Dripped | $2.3 \times 10^4$ | 98 | 70 | 41 |
| 6 | HB | Dripped | $2.3 \times 10^4$ | 98 | 70 | 52 |
| Comp. Ex. 7 | V-2 | Dripped | $2.4 \times 10^4$ | 99 | 81 | 60 |
| 8 | V-1 | Dripped | $2.4 \times 10^4$ | 97 | 50 | 58 |
| 9 | V-2 | Dripped | $2.4 \times 10^4$ | 100 | 75 | 34 |
| 10 | V-2 | Dripped | $2.5 \times 10^4$ | 98 | 60 | 39 |
| 11 | v-2 | Dripped | $2.3 \times 10^4$ | 98 | 43 | 40 |
| 12 | HB | Dripped | $2.3 \times 10^4$ | 99 | 77 | 70 |
| 13 | V-2 | Dripped | $2.3 \times 10^4$ | 100 | 51 | 64 |
| 14 | V-1 | Dripped | $2.2 \times 10^4$ | 98 | 46 | 44 |
| 15 | V-2 | Dripped | $2.3 \times 10^4$ | 87 | 38 | 32 |
| 16 | HB | Dripped | $2.3 \times 10^4$ | 85 | 49 | 39 |

Table 3 shows that the flame-retardant resin compositions of the present invention prepared in Examples 1 to 16 are excellent in both flame retardancy and mechanical properties compared with the flame-retardant resin compositions free of a thermotropic liquid crystal polymer which were prepared for comparison in Comparative Examples 1 to 16.

The flame-retardant resin compositions of the present invention are free of the problems arising due to the presence of halogen element, and are excellent in flame retardancy, mechanical properties, molding processability, etc. Moreover, the compositions of the invention can achieve a remarkable result of being unlikely to cause dripping without use of a dripping inhibitor such as PTFE containing halogen element.

What is claimed is:

1. A flame-retardant resin composition comprising:

(A) 100 parts by weight of a thermoplastic resin other than a thermotropic liquid crystal polymer, (B) 0.01 to 50 parts by weight of a thermotropic liquid crystal polymer, and (C) 1 to 30 parts by weight of a halogen-free phosphazene compound, wherein the phosphazene compound (C) is a cyclic phosphazene compound represented by the formula (1)

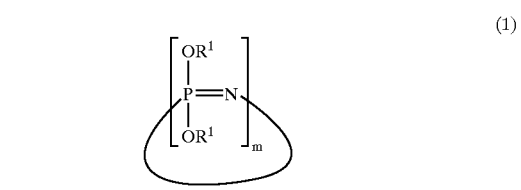

wherein m is an integer of 3 to 25, two $R^1$ groups are the same or different and each represents a phenyl group substituted with at least one member selected from the group consisting of $C_{1-6}$ alkyl groups and an allyl group, or an unsubstituted phenyl group.

2. A flame-retardant resin composition comprising:

(A) 100 parts by weight of a thermoplastic resin other than a thermotropic liquid crystal polymer, (B) 0.01 to 50 parts by weight of a thermotropic liquid crystal polymer, and (C) 1 to 30 parts by weight of a halogen-free phosphazene compound, wherein the phosphazene compound (C) is a straight-chain phosphazene compound represented by the formula (2)

wherein n is an integer of 3 to 1000, two $R^1$ groups are the same or different and each represents a phenyl group substituted with at least one member selected from the group consisting of $C_{1-6}$ alkyl groups and an allyl group, or an unsubstituted phenyl group, X represents a group $-N=P(OR^1)_3$ or a group $-N=P(O)OR^1$, and Y represents a group $-P(OR^1)_4$ or a group $-P(O)(OR^1)_2$.

3. A flame-retardant resin composition comprising:
(A) 100 parts by weight of a thermoplastic resin other than a thermotropic liquid crystal polymer,
(B) 0.01 to 50 parts by weight of a thermotropic liquid crystal polymer, and
(C) 1 to 30 parts by weight of a halogen-free phosphazene compound,
   wherein the phosphazene compound (C) is a crosslinked phosphazene compound in which at least one of a cyclic phosphazene compound represented by the formula (1)

wherein m is an integer of 3 to 25, two $R^1$ groups are the same or different and each represents a phenyl group substituted with at least one member selected from the group consisting of $C_{1-6}$ alkyl groups and an allyl group or an unsubstituted phenyl group, and a straight-chain phosphazene compound represented by the formula (2)

wherein n is an integer of 3 to 1000, $R^1$ is as defined above, X represents a group $-N=P(OR^1)_3$ or a group $-N=P(O)OR^1$, and Y represents a group $-P(OR^1)_4$ or a group $-P(O)(OR^1)_2$, is crosslinked with at least one crosslinking group selected from the class consisting of o-phenylene group, m-phenylene group, p-phenylene group, biphenylene group, and a group represented by the formula

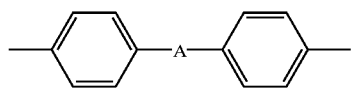

wherein A is a group $-SO_2-$, a group $-S-$, a group $-O-$ or a group $-C(CH_3)_2-$, each of said crosslinking groups replacing $R^1$ groups of the phosphazene compounds of formula (1) or (2) and crosslinking said compounds at the remaining oxygen atoms, the amount of $R^1$ groups left in the crosslinked phosphazene compounds being 50% to 99.9% based on the total number of $R^1$ groups in the phosphazene compounds prior to the crosslinking.

4. A flame-retardant resin composition comprising:
(A) 100 parts by weight of a thermoplastic resin other than a thermotropic liquid crystal polymer,
(B) 0.01 to 50 parts by weight of a thermotropic liquid crystal polymer, and (C) 1 to 30 parts by weight of a halogen-free phosphazene compound,
   wherein the phosphazene compound (C) is at least one phosphazene compound selected from the group consisting of a cyclic phosphazene compound represented by the formula (3)

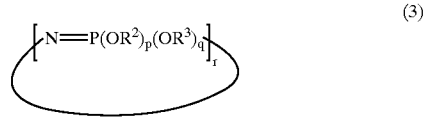

wherein $R^2$ is a cyano-substituted phenyl group; $R^3$ is an alkyl group having 1 to 18 carbon atoms or an aryl group having 6 to 10 carbon atoms; these groups may be substituted with at least one group selected from the group consisting of alkyl groups having 1 to 10 carbon atoms, allyl groups and aryl groups; when two or more $R^3$ groups exist, the $R^3$ groups may be the same or different; p and q are numbers which fulfil the requirements that p>0, q≧0, and p+q=2; and r is an integer of 3 to 25; and a straight-chain phosphazene compound represented by the formula (4)

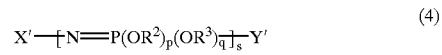

wherein $R^2$, $R^3$, p and q are as defined above; s is an integer of 3 to 1000; X' is a group $-P(OR^2)_4$, a group $-P(OR^2)_3(OR^3)$, a group $-P(OR^2)_2(OR^3)_2$, a group $-P(OR^2)(OR^3)_3$, a group $-P(OR^3)_4$, a group $-P(O)(OR^2)_2$, a group $-P(O)(OR^2)(OR^3)$, or a group $-P(O)(OR^3)_2$; and Y' is a group $-N=P(OR^2)_3$, a group $-N=P(OR^2)_2(OR^3)$, a group $-N=P(OR^2)(OR^3)_2$, a group $-N=P(OR^3)_3$, a group $-N=P(O)OR^2$ or a group $-N=P(O)OR^3$.

5. The composition according to claim 1, wherein the thermoplastic resin (A) is at least one resin selected from the group consisting of polyethylene, polypropylene, polyisoprene, polybutadiene, polystyrene, high impact-resistant polystyrene, acrylonitrile-styrene resin, acrylonitrile-butadiene-styrene resin, methyl methacrylate-butadiene-styrene resin, methyl methacrylate-acrylonitrile-butadiene-styrene resin, acrylonitrile-acrylic rubber-styrene resin, polyalkyl (meth)acrylate, aromatic polycarbonate, polyphenylene ether, polyphenylene sulfide, polyether sulfone, polysulfone, polybutyrene terephthalate, polyethylene terephthalate, polyamide, polyether ketone, polyether ether ketone, polyamide imide, polyether imide, and polyimide.

6. The composition according to claim 5, wherein the thermoplastic resin (A) is at least one resin selected from the group consisting of aromatic polycarbonate, polybutyrene terephthalate, polyphenylene ether, acrylonitrile-butadiene-styrene resin, and high impact-resistant polystyrene.

7. The composition according to claim 6, wherein the thermotropic liquid crystal polymer (B) is a polyester polymer.

8. The composition according to claim 7, wherein the polyester polymer is (i) a liquid crystal polymer selected from the group consisting of polymers having, as main structural units, aromatic hydroxycarboxylic acid, polyalkylenediol and aromatic dicarboxylic acid; those having, as main structural units, aromatic hydroxycarboxylic acid and hydroxynaphthoic acid; and those having, as main structural units, aromatic hydroxycarboxylic acid, aromatic dicarboxylic acid and dihydroxybiphenyl; or (ii) a liquid crystal polymer selected from the group consisting of polymers having polyphosphazene as a main chain, and polyalkylenediol and aromatic carboxylic acid as a side chain; and those having polyphosphazene as a main chain and poly(alkyleneoxy)alkoxyazobenzene as a side chain.

9. The composition according to claim 2, wherein the thermoplastic resin (A) is at least one resin selected from the group consisting of polyethylene, polypropylene, polyisoprene, polybutadiene, polystyrene, high impact-resistant polystyrene, acrylonitrile-styrene resin, acrylonitrile-butadiene-styrene resin, methyl methacrylate-butadiene-styrene resin, methyl methacrylate-acrylonitrile-butadiene-styrene resin, acrylonitrile-acrylic rubber-styrene resin, polyalkyl (meth)acrylate, aromatic polycarbonate, polyphenylene ether, polyphenylene sulfide, polyether sulfone, polysulfone, polybutyrene terephthalate, polyethylene terephthalate, polyamide, polyether ketone, polyether ether ketone, polyamide imide, polyether imide, and polyimide.

10. The composition according to claim 9, wherein the thermoplastic resin (A) is at least one resin selected from the group consisting of aromatic polycarbonate, polybutyrene terephthalate, polyphenylene ether, acrylonitrile-butadiene-styrene resin, and high impact-resistant polystyrene.

11. The composition according to claim 2, wherein the thermotropic liquid crystal polymer (B) is a polyester polymer.

12. The composition according to claim 11, wherein the polyester polymer is (i) a liquid crystal polymer selected from the group consisting of polymers having, as main structural units, aromatic hydroxycarboxylic acid, polyalkylenediol and aromatic dicarboxylic acid; those having, as main structural units, aromatic hydroxycarboxylic acid and hydroxynaphthoic acid; and those having, as main structural units, aromatic hydroxycarboxylic acid, aromatic dicarboxylic acid and dihydroxybiphenyl; or (ii) a liquid crystal polymer selected from the group consisting of polymers having polyphosphazene as a main chain, and polyalkylenediol and aromatic carboxylic acid as a side chain; and those having polyphosphazene as a main chain and poly(alkyleneoxy)alkoxyazobenzene as a side chain.

13. The composition according to claim 3, wherein the thermoplastic resin (A) is at least one resin selected from the group consisting of polyethylene, polypropylene, polyisoprene, polybutadiene, polystyrene, high impact-resistant polystyrene, acrylonitrile-styrene resin, acrylonitrile-butadiene-styrene resin, methyl methacrylate-butadiene-styrene resin, methyl methacrylate-acrylonitrile-butadiene-styrene resin, acrylonitrile-acrylic rubber-styrene resin, polyalkyl (meth)acrylate, aromatic polycarbonate, polyphenylene ether, polyphenylene sulfide, polyether sulfone, polysulfone, polybutyrene terephthalate, polyethylene terephthalate, polyamide, polyether ketone, polyether ether ketone, polyamide imide, polyether imide, and polyimide.

14. The composition according to claim 13, wherein the thermoplastic resin (A) is at least one resin selected from the group consisting of aromatic polycarbonate, polybutyrene terephthalate, polyphenylene ether, acrylonitrile-butadiene-styrene resin, and high impact-resistant polystyrene.

15. The composition according to claim 3, wherein the thermotropic liquid crystal polymer (B) is a polyester polymer.

16. The composition according to claim 15, wherein the polyester polymer is (i) a liquid crystal polymer selected from the group consisting of polymers having, as main structural units, aromatic hydroxycarboxylic acid, polyalkylenediol and aromatic dicarboxylic acid; those having, as main structural units, aromatic hydroxycarboxylic acid and hydroxynaphthoic acid; and those having, as main structural units, aromatic hydroxycarboxylic acid, aromatic dicarboxylic acid and dihydroxybiphenyl; or (ii) a liquid crystal polymer selected from the group consisting of polymers having polyphosphazene as a main chain, and polyalkylenediol and aromatic carboxylic acid as a side chain; and those having polyphosphazene as a main chain and poly(alkyleneoxy)alkoxyazobenzene as a side chain.

17. The composition according to claim 4, wherein the thermoplastic resin (A) is at least one resin selected from the group consisting of polyethylene, polypropylene, polyisoprene, polybutadiene, polystyrene, high impact-resistant polystyrene, acrylonitrile-styrene resin, acrylonitrile-butadiene-styrene resin, methyl methacrylate-butadiene-styrene resin, methyl methacrylate-acrylonitrile-butadiene-styrene resin, acrylonitrile-acrylic rubber-styrene resin, polyalkyl (meth)acrylate, aromatic polycarbonate, polyphenylene ether, polyphenylene sulfide, polyether sulfone, polysulfone, polybutyrene terephthalate, polyethylene terephthalate, polyamide, polyether ketone, polyether ether ketone, polyamide imide, polyether imide, and polyimide.

18. The composition according to claim 17, wherein the thermoplastic resin (A) is at least one resin selected from the group consisting of aromatic polycarbonate, polybutyrene terephthalate, polyphenylene ether, acrylonitrile-butadiene-styrene resin, and high impact-resistant polystyrene.

19. The composition according to claim 4, wherein the thermotropic liquid crystalspolymer (B) is a polyester polymer.

20. The composition according to claim 19, wherein the polyester polymer is (i) a liquid crystal polymer selected from the group consisting of polymers having, as main structural units, aromatic hydroxycarboxylic acid, polyalkylenediol and aromatic dicarboxylic acid; those having, as main structural units, aromatic hydroxycarboxylic acid and hydroxynaphthoic acid; and those having, as main structural units, aromatic hydroxycarboxylic acid, aromatic dicarboxylic acid and dihydroxybiphenyl; or (ii) a liquid crystal polymer selected from the group consisting of polymers having polyphosphazene as a main chain, and polyalkylenediol and aromatic carboxylic acid as a side chain; and those having polyphosphazene as a main chain and poly(alkyleneoxy)alkoxyazobenzene as a side chain.

* * * * *